(12) United States Patent
Riedle (10) Patent No.: US 6,718,435 B2
(45) Date of Patent: Apr. 6, 2004

(54) METHOD AND SYSTEM FOR MIGRATING DATA IN A RAID LOGICAL DRIVE MIGRATION

(75) Inventor: Linda Ann Riedle, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 09/929,445

(22) Filed: Aug. 14, 2001

(65) Prior Publication Data

US 2003/0039148 A1 Feb. 27, 2003

(51) Int. Cl.$^7$ .............................. G06F 3/06; G06F 12/00
(52) U.S. Cl. ...................... 711/114; 711/161; 711/162; 712/228; 714/6; 714/16; 714/17; 714/19
(58) Field of Search ................................. 711/114, 161, 711/162; 714/19, 17, 16, 6; 712/228

(56) References Cited

U.S. PATENT DOCUMENTS

| | | |
|---|---|---|
| 5,313,626 A | 5/1994 | Jones et al. |
| 5,315,602 A | 5/1994 | Noya et al. |
| 5,506,977 A | 4/1996 | Jones |
| 5,742,752 A | 4/1998 | DeKoning |
| 5,790,773 A | 8/1998 | DeKoning et al. |
| 5,822,584 A | 10/1998 | Thompson et al. |
| 5,913,927 A | 6/1999 | Nagaraj et al. |
| 5,974,544 A | 10/1999 | Jeffries et al. |
| 6,138,125 A | 10/2000 | DeMoss |

OTHER PUBLICATIONS

IBM Corporation, Understanding IBM® ServeRAID™ Technology, pp. 1–13.

*Primary Examiner*—Kevin Verbrugge
*Assistant Examiner*—Mehdi Namazi
(74) *Attorney, Agent, or Firm*—Bracewell & Patterson LLP; Martin McKinley (57) ABSTRACT

A method and system for improving data migration from source data stripes to destination stripes in a Redundant Array of Independent Drives (RAID) logical drive migration (LDM). The invention describes a procedure for checkpointing data migrations, so that if the system should fail in the middle of the LDM, the computer can resume the LDM from the last checkpointed destination stripes, thus ensuring accurate tracking of data location. Further, the invention also provides the capability of properly checkpointing a data write to a stripe according to whether or not the stripe unit has been migrated previously.

21 Claims, 4 Drawing Sheets

METHOD AND SYSTEM FOR MIGRATING DATA IN A RAID LOGICAL DRIVE MIGRATION

BACKGROUND OF THE INVENTION

1. Technical Field

The present invention relates in general to improved data storage systems and in particular to an improved method and system for transferring data from a first data storage configuration to a second data storage configuration. Still more particularly, the present invention relates to an improved method and system for checkpointing data being migrated during a logical drive migration, a rebuild, a copy or other background process.

2. Description of the Related Art

As the performance of microprocessor and memory technology improves, there is a need for better data storage systems with comparable performance enhancements. Additionally, in enhancing the performance of data storage systems, there is a need for improved reliability of data storage. In 1988 a paper was published by Patterson, Gibson and Katz titled, *A Case for Redundant Arrays of Inexpensive Disks (RAID)*, International Conference on Management Data, pages 109–116, June 1988. This paper laid the foundation for the use of redundant arrays and inexpensive disks that would not only improve the data transfer rate and data I/O rate over a comparable single disk access, but would also provide error correction at a lower cost in data storage systems.

RAID technology utilizes the grouping of several physical drives in a computer into an array that can be defined as one or more logical drives. Each logical drive appears to the operating system as a single drive. This grouping technique enhances logical drive capacity and performance beyond the physical limitations of a single physical drive. When multiple physical drives are grouped into a logical drive, a RAID controller can transfer data in parallel from the multiple drives in the array. This paralleled transferring yields data transfer rates that are many times higher than with non-array drives. This increased speed makes the system better able to meet the throughput (the amount of data processed in a given amount of time) or productivity needs of the multiple user network environment, as well as decreasing response time. The combination of parallel transfers and simultaneous responses to multiple requests allows disk arrays to provide a high level of performance in network environments.

With RAID technology, data is striped across an array of physical drives. This data-distribution scheme complements the way the operating system requests data. The granularity, at which data is stored on one drive of the array before subsequent data is stored on the next drive of the array, is called the stripe-unit size. The stripe-unit size can be controlled to maximize the performance of the RAID controller by setting a stripe-unit size to a value that is close to the size of the system I/O request. Typically, this stripe-unit size is 8 KB, 16 KB, 32 KB or 64 KB. The collection of stripe-units, from the first physical drive of the array to the last physical drive of the array, is called a stripe.

RAID levels are essentially defined by if and how they accomplish redundancy of data storage. There are six standardized RAID levels, termed RAID 0, 1, 2, 3, 4 or 5. The most common RAID levels used are levels 0, 1 and 5.

RAID level-0 stripes the data across all the drives in the array with no data redundancy. RAID level-0 provides the largest storage capacity of the RAID levels that are offered, because no room is taken for the redundant data or data parity storage. A simple example of a RAID level-0 logical drive uses two physical drives combined to create an array. A logical drive is then created within that array and the data is striped across all the drives in the array creating blocks. The blocks, each of which correlates to a particular stripe unit, hold the data. Note that the terms "block" and "stripe unit" may be used interchangeably. Typically, the first physical drive will contain every other block of data from the original source, with the second physical drive in the logical drive holding the remaining alternate data blocks.

RAID level-1 provides 100% data redundancy and requires a minimum of two physical drives. With RAID level-1, the first half of the stripe is the original data; the second half of the stripe is a mirror (exact copy) of the data, but written to the other drive in the RAID level-1 array. Because the data is mirrored, the capacity of the logical drive when assigned RAID level-1 is 50% of the array capacity. To establish a typical RAID level-1 logical drive, two physical drives create an array, which creates a single logical drive. The data is striped across the drives creating blocks that are mirror copies between the two physical drives. During normal operations, the RAID controller reads data from either physical drive within the array. If one of the physical drives fails, the RAID controller switches read and write requests to only the remaining functional drive in the RAID level-1 array. A back-up hot-spare drive can also be provided for immediate rebuild of the failed physical drive.

RAID level-5 requires a minimum of three physical drives. This RAID level stripes data and parity across all drives in the array. This parity/data storage reduces the capacity of the array by one drive. A typical RAID level-5 logical drive starts with four physical drives. An array is created using three of the physical drives, leaving the fourth as a hot-spare drive. A logical drive is created within the three drive array and data is striped across the drives creating blocks. Within each stripe is at least one parity block. Typically, the parity block stores the result of an Exclusive OR (XOR) logical function of the data in the other two physical drives in the stripe. If a drive holding a data stripe unit fails, that data stripe-unit (block) can be reconstructed by applying the XOR logical operation to the remaining data stripe. For example, if the data bit in the still functional physical drive is 1 and the XOR parity bit is 1, then the lost data bit in the failed drive would be 0. If the remaining data bit is 1 and the parity bit for XOR is 0, then the lost data bit must be 1. The parity bit check is more efficient than mirroring, since a single XOR or other parity bit can rebuild either drive that fails. If a physical drive fails in the RAID level-5 array, the hot-spare drive is rebuilt to contain data that was lost in the failed drive, and the RAID controller switches read and write functions to that hot-spare drive for data that was in the failed drive.

A logical drive migration moves data from a first configuration of a logical drive to a second configuration of the same logical drive. This migration may be from one RAID level to another RAID level, or from a first configuration of a logical drive to a second configuration of the logical drive, typically with the second configuration having a higher number of physical drives than the first configuration. During the logical drive migration, it is possible for the system to shut down. If this occurs without checkpointing the progress of the migration, the system will not know which data has been overwritten during the migration or where to find the stripe unit for the updated data.

As each stripe is migrated, a checkpoint can be recorded for that stripe to keep track of the migration process. If the system should fail during the migration, then the migration can simply pick back up at the last checkpoint. However, this high frequency of checkpointing is very expensive, since every checkpoint obviously must be stored for future retrieval. If this checkpoint is stored on a disk drive, the checkpoint saving function is very slow. If the checkpoint is saved in a control area at the beginning or end of the drive space from the logical drive being migrated, then the disk head must move back and forth from the data being migrated to the checkpointing area, which is mechanically and temporally prohibitive. Even if the system has NonVolatile Random Access Memory (NVRAM) the checkpointing is still not trivial as the NVRAM access is typically much slower than regular memory access.

It should therefore be apparent that there exists a need for a method that will improve the performance of a logical drive migration by the use of intelligent checkpointing. It would further be desirable to devise a computer program product wherein such a method may be performed on a computer system. In addition, it would be desirable to devise a multiple drive system having improved logical drive capability.

SUMMARY OF THE INVENTION

The present invention incorporates a method for determining if a destination stripe in a second configuration of a logical drive contains data that, when migrated, will overlay data in a first configuration of the logical drive before the destination stripe has been checkpointed. Prior to the migration of the data to the destination stripe, the overlaid data must be checkpointed to let the system know where it has migrated. A device implementing the invention may be embodied in a RAID controller at any RAID level. In addition, the above described method may be used to checkpoint data migration in other data storage background processes, such as rebuilds and copies. The present invention may also be embodied in a computer program product having machine-readable instructions for carrying out the above described method.

The above, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as the preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
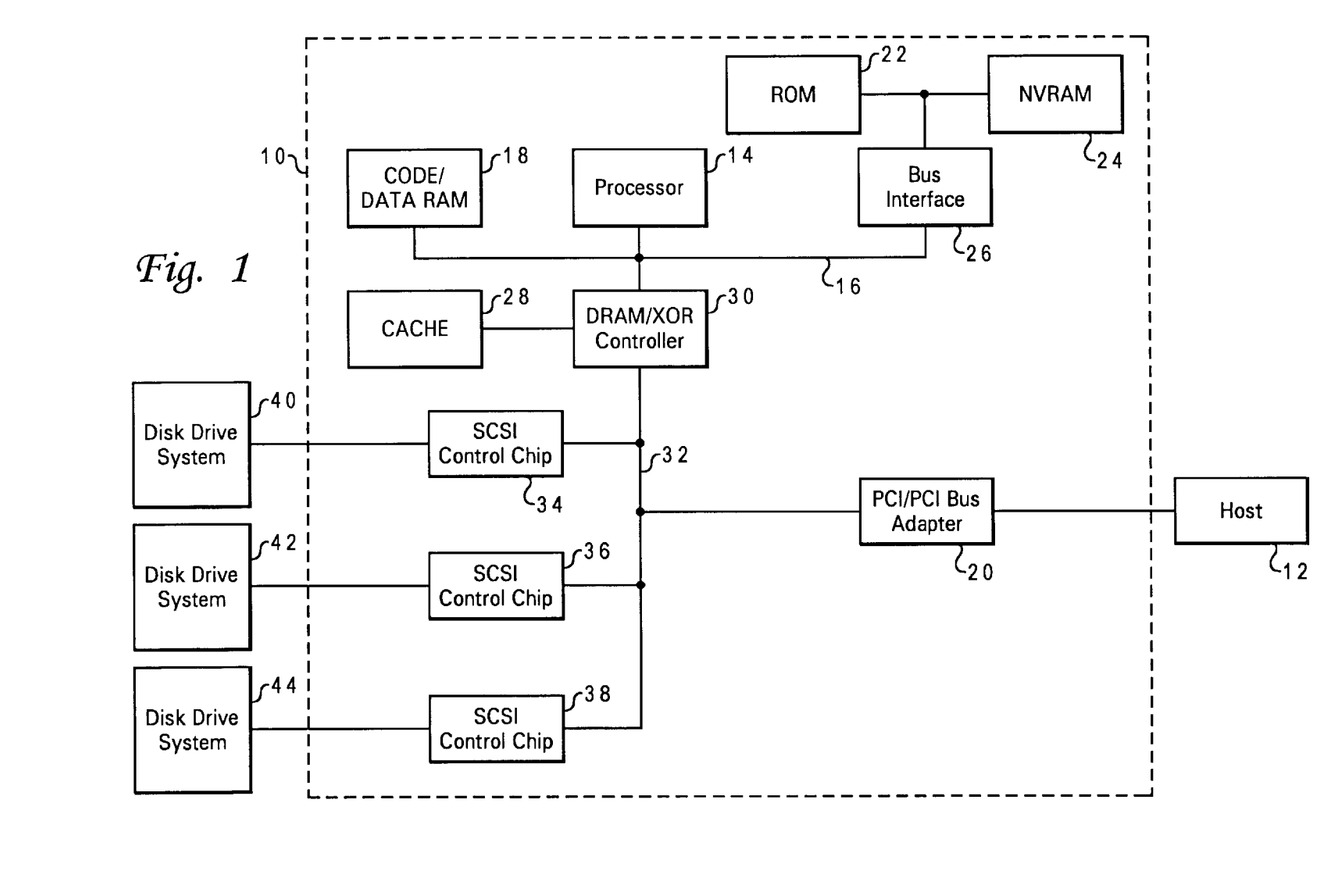
FIG. 1 depicts a block diagram of a data storage system that may be utilized according to a preferred embodiment of the present invention.

With reference now to the figures and in particular with reference to FIG. 1, there is depicted a block diagram of a RAID data storage system that may be utilized to implement the present invention. As depicted, a RAID data storage system 10 is coupled to a host system 12 via a Peripheral Component Interconnect PCI bus adapter 20. Data storage system 10 and host system 12 may be incorporated in a single hardware unit, such as a data processing system (not shown). Alternatively, data storage system 10 may be incorporated into one hardware unit and host system 12 may be incorporated into another hardware unit, such as the data processing system.

Host system 12 may be implemented in a variety of data processing systems under a number of different operating systems. Data processing systems may be, for example, a personal computer, a mini computer, or mainframe computer. The data processing systems may be a stand-alone system or part of a network such as a local area network (LAN) or a wide area network (WAN).

As illustrated, a processor 14 is utilized to control data storage system 10 which is preferably a RAID data storage system. Processor 14 is preferably an advanced microprocessor that is coupled to processor bus 16. As depicted, also coupled to processor bus 16 is code/data Random Access Memory RAM 18 which is utilized to temporarily store code and data utilized by processor 14. Processor 14 interacts with RAM 18 to read and execute read commands from host processor 12 stored in RAM. Read Only Memory ROM 22 and NonVolatile Random Access Memory (NVRAM) 22 are typically accessed by utilizing an 8-bit bus and thus bus interface 26 is utilized to interface those devices to processor bus 16, which typically utilizes a 32-bit bus.

Operational code is typically stored in ROM 22, which, as those skilled in the art will appreciate, is generally provided utilizing so-called "flash" ROM. Operational code is thereafter fetched from ROM 22 by processor 14 upon initiation of the operation to direct the operation of processor 14 to perform functions including the functions of the present invention. NVRAM 24 is typically a low powered Complementary Metal Oxide Semiconductor CMOS memory which is powered up for "back-up" by a battery such that the information stored in NVRAM 24 will not be lost when main power is terminated. Thus, NVRAM 24 may be utilized to store configuration data or operational code in a manner similar to that stored within ROM 22. ROM 22 is generally updated at initial power application and any changes to system configuration during operation are stored within NVRAM 24 and then entered into a "device change list" which is also stored within NVRAM 24 and on each disk drive within the system.

A cache 28 is also provided which is coupled to a Dynamic Random Access Memory/eXclusive "OR" DRAM/XOR controller 30. Cache 28 may be configured into multiple temporary storage positions where each temporary storage position may be referenced to as a page of cache 28. DRAM/XOR controller 30 is utilized to control access to random access memory and also provides a hardware implemented eXclusive OR (XOR) circuit which may be utilized to rapidly and efficiently calculate parity for changes in updated data.

DRAM/XOR controller 30 is coupled to local bus 32. Also coupled to local bus 32 are multiple Small Computer System Interface (SCSI) controller chips 34, 36 and 38. Each SCSI control chip 34, 36 and 38 is defined as including channels which may each support a disk drive storage system comprised from multiple disks. Those having ordinary skills in the art will appreciate that alternative interface bus architectures may be utilized to implement the data storage system. Such alternative bus architectures may include Intelligent Drive Electronics IDE, Enhanced Intelligent Drive Electronics EIDE, Fiber Channel, etc. However, the depicted embodiment of the present invention utilizes multiple disk drive data storage systems 40, 42 and 44 that are configured in the SCSI bus architecture.

Figure 2:
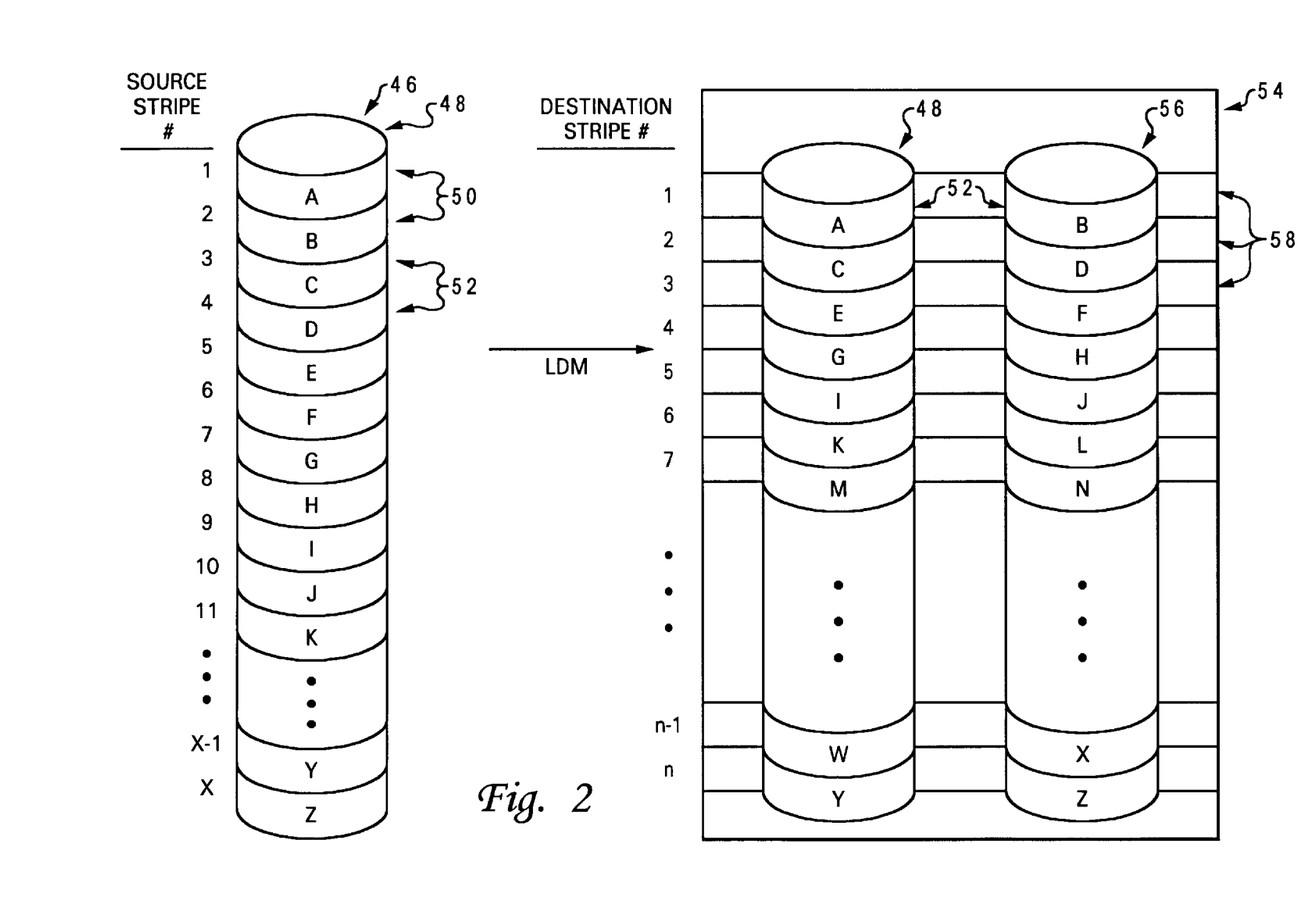
FIG. 2 illustrates a pictorial image of a RAID logical drive migration moving data from a one drive RAID level 0 to a two-drive RAID level 0.

Referring now to FIG. 2, there is illustrated a pictorial image of a RAID level-0 disk drive system of the present invention. It is understood that the present invention may be used with any level of RAID, using any number of physical drives to define a logical drive. For clarity, the present invention will be described as migrating a one-drive RAID level-0 to a 2-drive RAID level-0 as depicted in FIG. 2. In the example shown, first logical drive configuration 46 is a one drive RAID level-0 logical drive having a single first physical drive 48, which is functionally equivalent to a single stand-alone partitioned drive. First physical drive 48 is comprised of multiple source stripes 50 labeled in FIG. 2 as source stripe #1 through source stripe "x." In the method steps following, a reference to "x" is a substitute for the source stripe number of source stripe 50, where "x−1" data stripe unit 52 sequentially precedes the "x" data stripe unit 52 and the "x" data stripe unit 52 sequentially precedes the "x+1" data stripe unit 52. Likewise, a reference to "n" is a substitute for the stripe number of destination stripe 58 in second logical drive configuration 54.

Each source stripe 50 has a unique and single stripe unit 52, whose size may be any established by the user. Typical stripe unit sizes for stripe units 52 are 8 KB, 16 KB, 32 KB or 64 KB. In the example shown, each source stripe 50 contains data, labeled in FIG. 2 as "A" through "Z" to correspond to source stripe 1 through source stripe x, respectively. The Logical Drive Migration (LDM) operation migrates data from first logical drive configuration 46 to second logical drive configuration 54. Second logical drive configuration 54 comprises first physical drive 48 found in first logical drive configuration 46, plus second physical drive 56. Second logical drive configuration 54 is striped across stripe units 52 to create a plurality of destination stripes 58, numbered stripes "1" through "n" in FIG. 2.

When first source stripes 50 containing data A and data B are migrated, data A from first logical drive configuration 46 overlays data A in first physical drive 48 of destination stripe 58 designated as destination stripe 1. Data B from source stripe 2 of first logical drive configuration 46 overlays new space in first stripe unit 52 of second physical drive 56. As data A was not actually moved, and data B overlaid new space, there is no need to checkpoint at this time. If the system were to crash and was then brought back up, data A and data B from first logical drive configuration 46 could be reread and migrated to second logical drive configuration 54 with the same result.

When destination stripe 58 designated as stripe 2 is overlaid, data C and data D from first logical drive configuration 46 are written to destination stripe 58 stripe 2. This migration will overlay data B from the old configuration that had data B in the second stripe of the first physical drive 48. Thus, destination stripe 58 stripe 1 cannot be remigrated, since data B as originally stored in first physical drive 48's stripe 2 would be gone. Therefore, the logical drive migration is checkpointed at destination stripe 58 stripe 1. The checkpoint is stored typically in either a hard drive, including one in the array of one of the logical drives, or in Non-Volatile Random Access Memory NVRAM in the system. The checkpoint logically describes the progress of the LDM. The migration is then performed, and the resultant data has data A and data B in destination stripe 58 stripe 1, and data C and data D in destination stripe 58 stripe 2.

Likewise, when migrating to destination stripe 58 stripe 3, data E and data F are read from first logical drive configuration 46 and written to destination stripe 58 stripe 3. This will overlay data C in stripe 3 of first physical drive 48, which means that destination stripe 58 stripe 2 cannot be remigrated because data C from first logical drive configuration 46 at stripe 3 would be gone. Therefore, the logical drive migration must be checkpointed at destination stripe 58 stripe 2. The data is migrated, with the resulting destination stripe 58 having data A and data B in stripe 1, data C and data D in stripe 2 and data E and data F in stripe 3.

Continuing on with destination stripe 4, data G and data H are written to destination stripe 58 stripe 4. This will overlay data D on stripe 4 in the first physical drive 48, which means that destination stripe 58 stripe 2 cannot be remigrated since data D would be gone. However, since destination stripe 58 stripe 2 has already been checkpointed, it does not need to be checkpointed again. The data migration is performed, and the resulting data has data A and data B in stripe 1, data C and data D in stripe 2, data E and data F in stripe 3, and data G and data H in stripe 4, all stripes being destination stripes 58.

Continuing on with stripe 5, data I and data J from first logical drive configuration 46 are read and written to destination stripe 58 stripe 5. This will overlay data E from the old configuration, which means that stripe 3 cannot be remigrated because data E would be gone. Therefore, destination stripe 58 stripe 3 would ordinarily need to be checkpointed. However, since migration has already occurred up through destination stripe 58 stripe 4, that last migrated stripe is checkpointed. That is, it is allowed to skip checkpointing destination stripe 58 stripe 3, since checkpointing destination stripe 58 stripe 4 will account for all data migration from data A through data H. The data migration to stripe 5 is then performed, and the resulting data looks like this:

| Stripe # | First Physical Drive 48 | Second Physical Drive 56 |
| --- | --- | --- |
| Stripe 1 | Data A | Data B |
| Stripe 2 | Data C | Data D |
| Stripe 3 | Data E | Data F |
| Stripe 4 | Data G | Data H |
| Stripe 5 | Data I | Data J |
| Stripe 6 | Data F | |
| Stripe 7 | Data G | |
| Stripe 8 | Data H | |
| Stripe 9 | Data I | |
| Stripe 10 | Data J | |
| Stripe 11 | Data K | |
| Stripe 12 | Data L | |
| Stripe 13 | Data M | |
| Stripe 14 | Data N | |
| Stripe 15 | Data O | |
| Stripe 16 | Data P | |
| Stripe 17 | Data Q | |
| Stripe 18 | Data R | |
| Stripe 19 | Data S | |
| Stripe 20 | Data T | |
| Stripe 21 | Data U | |
| Stripe 22 | Data V | |
| Stripe 23 | Data W | |
| Stripe 24 | Data X | |
| Stripe 25 | Data Y | |
| Stripe 26 | Data Z | |

Continuing on with subsequent destination stripes 58, data is read from first logical drive configuration 46 and written to second logical drive configuration 54. As data migration continues down to stripe 9 of destination stripes 58, first physical drive 48 and second physical drive 56 of second logical drive configuration 54 and source logical drive 46 would contain data in the following configuration:

| Stripe # | First Physical Drive 48 | Second Physical Drive 56 |
| --- | --- | --- |
| Stripe 1 | Data A | Data B |
| Stripe 2 | Data C | Data D |
| Stripe 3 | Data E | Data F |
| Stripe 4 | Data G | Data H |
| Stripe 5 | Data I | Data J |
| Stripe 6 | Data K | Data L |
| Stripe 7 | Data M | Data N |
| Stripe 8 | Data O | Data P |
| Stripe 9 | Data I | |
| Stripe 10 | Data J | |
| Stripe 11 | Data K | |
| Stripe 12 | Data L | |
| Stripe 13 | Data M | |
| Stripe 14 | Data N | |
| Stripe 15 | Data O | |
| Stripe 16 | Data P | |
| Stripe 17 | Data Q | |
| Stripe 18 | Data R | |
| Stripe 19 | Data S | |
| Stripe 20 | Data T | |
| Stripe 21 | Data U | |
| Stripe 22 | Data V | |
| Stripe 23 | Data W | |
| Stripe 24 | Data X | |
| Stripe 25 | Data Y | |
| Stripe 26 | Data Z | |

At this point, data H which was originally in first logical drive configuration source stripe 50 stripe 8, and all preceding data A through data G, has been accounted for due to the checkpointing of destination stripe 58 stripe 4. Before overlaying stripe 9, which contains data I in first physical drive 48, destination stripe 58 stripe 5 must be checkpointed to update the system regarding the location of data I. However, since migration has already occurred through destination stripe 58 stripe 8, the checkpoint is applied to destination stripe 58 stripe 8. Thus, there is no need to checkpoint destination stripes 58 stripes 5, 6 or 7. Continuing along the same vein, it is obvious that checkpointing does not need to be performed again until the source data in first physical drive 48 is being overlaid and that source data has not been accounted for and checkpointed from an earlier migration. In the present description of a logical drive migration from a RAID level 0 1-drive to a RAID level 0 2-drive, checkpointing will need to occur at stripe 1, stripe 2, stripe 4, stripe 8, stripe 16, stripe 32, etc.

As the required intervals between checkpoints increases progressively, a short way into the migration will result in migration of hundreds of stripes without the prompt to checkpoint due to data overlay. At some predetermined number of source data migrations, a threshold stripe checkpoint should be recorded to a destination stripe.

Figure 3:
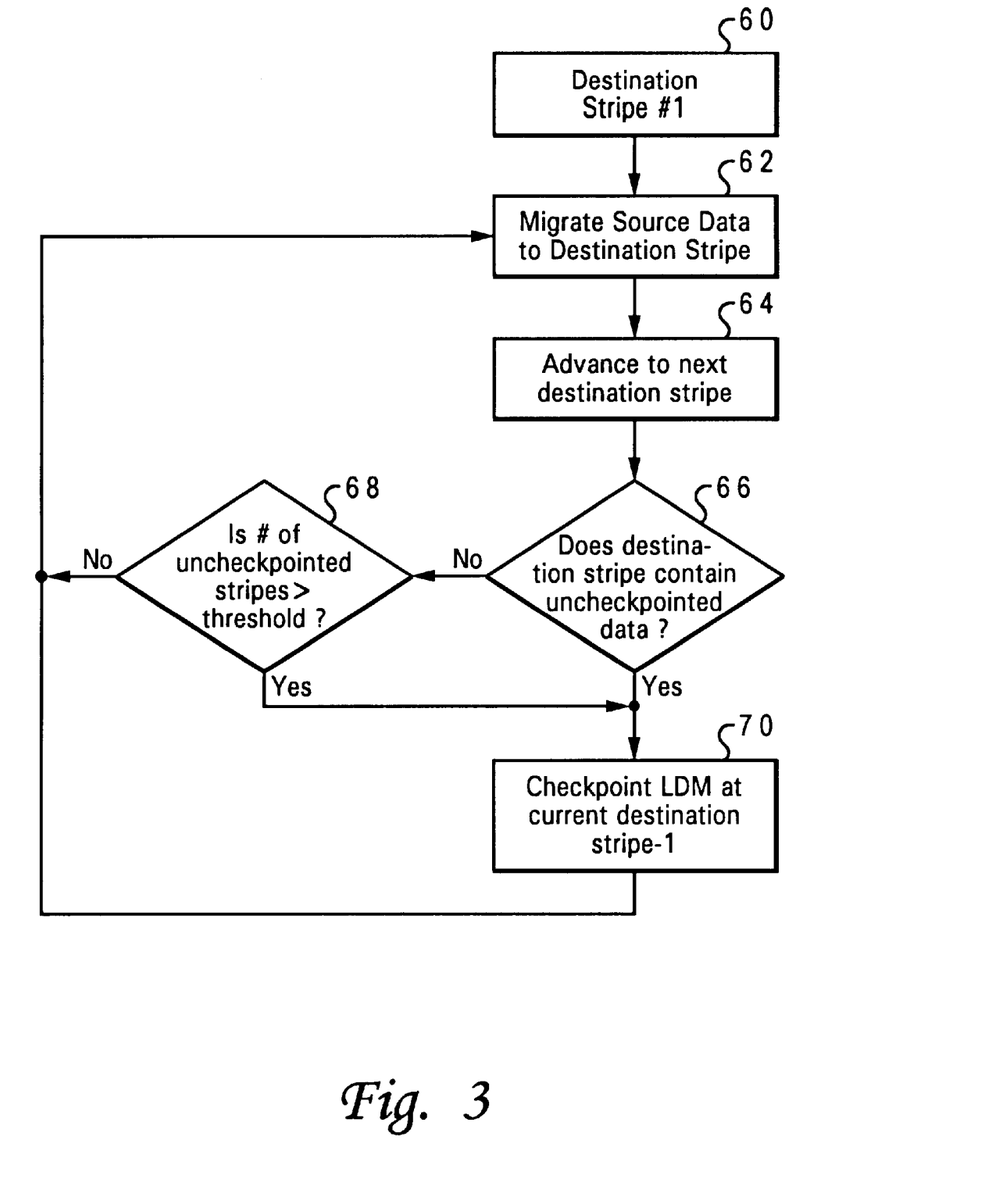
FIG. 3 depicts a high-level logic flow chart that illustrates the method of the present invention's checkpoint system in a logical drive migration.

With reference now to FIG. 3, there is depicted a high-level flowchart that illustrates the present invention. It should be appreciated by those skilled in the art that FIG. 3 represents a self-consistent sequence of steps leading to a desired result. The steps are those requiring physical manipulation of physical qualities. Usually, although not necessarily, these quantities take the form of electrical, optical, or magnetic signals capable of being stored, transferred, combined, compared and otherwise manipulated. It has proven convenient at times by those skilled in the art, to refer to these signals as bits, values, elements, symbols, characters, terms, numbers or the like. It should be borne in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by human operators. No such capability of a human operator is necessary or desirable in most cases in any of the operations described herein which form part of the present invention; the operations are machine operations. Useful machines for performing operations of a preferred embodiment of the present invention include data processing systems such as general purpose digital computers or other similar devices. In all cases, the distinction between the method operations and operating a computer and the method of computation itself should be born in mind. The present invention relates to method steps for operating a processor such as processor 14 of FIG. 1, in processing electrical or other physical signals to generate desired physical signals.

As illustrated, the process described in FIG. 3 begins as depicted at block 60 and thereafter passes to the step described in block 72. Block 60 depicts pointing to destination stripe 58 stripe 1. Source data from first logical drive configuration 46 is migrated initially to destination stripe 58 stripe 1, as illustrated in block 62. The process continues by advancing to the next destination stripe, as depicted in block 64. Block 66 depicts a determination of whether the current destination stripe, at this stage being destination stripe 58 stripe 2, contains uncheckpointed data. Uncheckpointed data is defined as that data that is in a destination stripe that has not received a checkpoint, either in the form of a destination stripe checkpoint or a threshold stripe checkpoint, which would have let the system know the current location of previously migrated data.

If the destination stripe does not contain uncheckpointed data, a determination is made if the number of uncheckpointed stripes exceeds a predetermined threshold number of source data migrations that have occurred since a last recording of a destination stripe checkpoint. If this predetermined number has not been exceeded, as illustrated in block 68, then the source data is migrated to the current destination stripe 58, as illustrated in block 62.

If the number of uncheckpointed stripes exceeds the predetermined threshold, then a threshold stripe checkpoint will be assigned to the destination stripe 58 sequentially immediately preceding the current destination stripe 58 (destination stripe n−1, as depicted in block 70). Further, if destination stripe 58 contains uncheckpointed data, with or without exceeding the predetermined threshold number of prior migrations since the last checkpointing, as depicted in block 66, a destination stripe checkpoint for the immediately prior (sequentially) destination stripe 58 is assigned, again as depicted in block 70.

Figure 4:
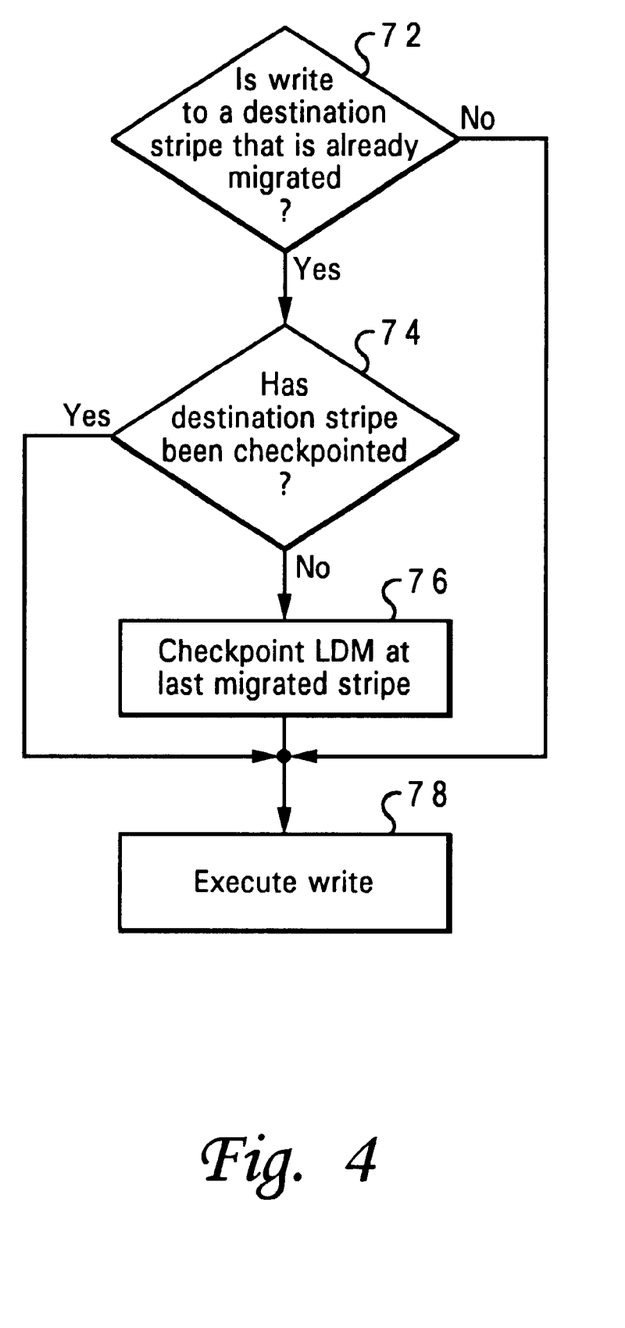
FIG. 4 illustrates a high-level logic flow chart that depicts a concurrent write during a logical drive migration.

It is a significant feature of the present invention to be able to handle incoming data write operations during the logical drive migration. As illustrated in the high-level flow chart depicted in FIG. 4, the invention is able to accept a write to either first logical drive configuration 46 or second logical drive configuration 54, depending on whether the write is to a stripe unit 52 block that has been migrated or not. Referring now to FIG. 4, a determination, as depicted in block 72, is made as to whether the data write function is to a destination stripe 58 that has already been migrated. If the write is not to a destination stripe 58 that has already been migrated, that is if it is to a source drive 50 that has not had its data migrated, then the write is executed to first logical drive configuration 46, as shown in block 78. If the data write operation is to a destination stripe 58 that has migrated, then a determination is made as to whether that destination stripe 58 has been checkpointed as depicted in block 74. If the destination stripe has been checkpointed, then the data write is executed as depicted in block 78. If the destination stripe 58 referenced in block 74 has not been checkpointed, then a checkpoint is assigned to the last migrated destination stripe 58. The last migrated destination stripe 58 referenced in block 76 may be a destination stripe 58 that is subsequent to the destination stripe 58 containing the stripe unit 52 to which the data write is to be executed. Obviously, the earliest destination stripe 58 to be checkpointed would be the destination stripe 58 immediately preceding the destination stripe 58 to which the data write operation is occurring. For example, with reference to FIG. 2, assume that the last destination stripe 58 to be checkpointed was destination stripe 4 and the data write is for data K. If the last migration was for a sequentially preceding destination stripe 58, such as stripe 5 (holding data I and J), then no checkpointing is necessary since the write is not to a destination stripe that has already migrated. If the last migration was for the current destination stripe 58 stripe 6 (holding data K and L), then destination stripe 58 stripe 6 would be the last migrated stripe and would be checkpointed prior to accepting the write for data K. If the last migration was for a sequentially subsequent destination stripe 58, such as stripe 7 (holding data M and N), the stripe 7 would be the last migrated stripe and would be checkpointed with the destination stripe checkpoint.

As can be seen in the description of the invention, this method and system provide a greatly improved way to monitor and keep track of data that has been migrated in an LDM. Checkpointing occurs only when logically necessary, that is when data is about to be overwritten (by the use of the described destination stripe checkpoints), thus corrupting the data storage, or when so many data migrations have occurred that to start over would be cumbersome and expensive (through the use of the described threshold stripe checkpoints). Thus, a logical and cost-effective system of checkpointing is accomplished. Additionally, the checkpointing system can be advantageously used to control data writes during the LDM by keeping track of the current logical drive location of a particular block.

Although aspects of the present invention have been described with respect to a data storage system, executing operational code that directs the method of the present invention, it should be understood that the present invention alternatively is implemented as a program product for use with a data storage system or computer system. Programs defining the functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct the method functions of the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention. In particular, although the primary example used for illustration has been in a simple RAID-0 configuration, other RAID levels may also use the method and system according to the present invention.

What is claimed is:

1. A method for migrating a plurality of source data in a logical drive from a first configuration to a second configuration within a Redundant Array of Inexpensive Drives (RAID) system, said method comprising:

migrating a source data to a current destination stripe;

advancing to a subsequent destination stripe; and recording a destination stripe checkpoint for an immediately preceding destination stripe if said subsequent destination stripe contains data that is not in a destination stripe having said destination stripe checkpoint.

2. The method of claim 1, further comprising:

repeating said migrating, advancing and recording stripe checkpoint steps for subsequent said source data until all said source data is migrated to said destination stripes.

3. The method of claim 1, further comprising:

recording a threshold stripe checkpoint for said immediately preceding destination stripe after a predetermined number of said source data migrations have occurred since a last recording of said destination stripe checkpoint.

4. The method of claim 3, further comprising:

recording said destination stripe checkpoint for said immediately preceding destination stripe if said subsequent destination stripe contains data that is not in said destination stripe having said threshold stripe checkpoint.

5. The method of claim 1, further comprising:

receiving an incoming data write to one of said plurality of source data;

executing said data write if said source data has not migrated to a write destination stripe;

executing, if said source data has migrated to said write destination stripe, said data write if said write destination stripe has recorded said destination stripe checkpoint or said threshold stripe checkpoint; and recording, if said data write is to said write destination stripe that has not recorded said destination stripe checkpoint or said threshold stripe checkpoint, a write destination stripe checkpoint to said destination stripe immediately preceding to said write destination stripe, and executing said data write to said write destination stripe.

6. The method of claim 1, wherein said method occurs during a logical drive migration.

7. The method of claim 1, wherein said method occurs during a drive rebuild.

8. A system in a data storage system for migrating a plurality of source data from a first logical drive configuration to a second logical drive configuration within a Redundant Array of Inexpensive Drives (RAID) system, said system comprising:

means for migrating a source data to a current destination stripe;

means for advancing to a subsequent destination stripe; and means for recording a destination stripe checkpoint for an immediately preceding destination stripe if said subsequent destination stripe contains data that is not in a destination stripe having said destination stripe checkpoint.

9. The system of claim 8, further comprising:

means for repeating said migrating, advancing and recording stripe checkpoint steps for subsequent said source data until all said source data is migrated to said destination stripes.

10. The system of claim 8, further comprising:

means for recording a threshold stripe checkpoint for said immediately preceding destination stripe after a pre-determined number of said source data migrations have occurred since a last recording of said destination stripe checkpoint.

11. The system of claim 10, further comprising:

means for recording said destination stripe checkpoint for said immediately preceding destination stripe if said subsequent destination stripe contains data that is not in said destination stripe having said threshold stripe checkpoint.

12. The system of claim 8, further comprising:

means for receiving an incoming data write to one of said plurality of source data;

means for executing said data write if said source data has not migrated to a write destination stripe;

means for executing, if said source data has migrated to said write destination stripe, said data write if said write destination stripe has recorded said destination stripe checkpoint or said threshold stripe checkpoint; and means for recording, if said data write is to said write destination stripe that has not recorded said destination stripe checkpoint or said threshold stripe checkpoint, a write destination stripe checkpoint to said destination stripe immediately preceding said write destination stripe, and executing said data write to said write destination stripe.

13. The system of claim 8, wherein said system is utilized during a logical drive migration.

14. The system of claim 7, wherein said system is utilized during a drive rebuild.

15. A computer program product for migrating a plurality of source data from a first logical drive configuration to a second logical drive configuration within a Redundant Array of Inexpensive Drives (RAID) system, said computer program product comprising:

computer program code for migrating a source data to a current destination stripe;

computer program code for advancing to a subsequent destination stripe; and computer program code for recording a destination stripe checkpoint for an immediately preceding destination stripe if said subsequent destination stripe contains data that is not in a destination stripe having said destination stripe checkpoint.

16. The computer program product of claim 15, further comprising computer program code for repeating said migrating, advancing and recording stripe checkpoint steps for subsequent said source data until all said source data is migrated to said destination stripes.

17. The computer program product of claim 15, further comprising computer program code for recording a threshold stripe checkpoint for said immediately preceding destination stripe after a pre-determined number of said source data migrations have occurred since a last recording of said destination stripe checkpoint.

18. The computer program product of claim 17, further comprising computer program code for recording said destination stripe checkpoint for said immediately preceding destination stripe if said subsequent destination stripe contains data that is not in said destination stripe having said threshold stripe checkpoint.

19. The computer program product of claim 15, further comprising:

computer program code for receiving an incoming data write to one of said plurality of source data;

computer program code for executing said data write if said source data has not migrated to a write destination stripe;

computer program code for executing, if said source data has migrated to said write destination stripe, said data write if said write destination stripe has recorded said destination stripe checkpoint or said threshold stripe checkpoint; and computer program code for recording, if said data write is to said write destination stripe that has not recorded said destination stripe checkpoint or said threshold stripe checkpoint, a write destination stripe checkpoint to said destination stripe immediately preceding said write destination stripe, and executing said data write to said write destination stripe.

20. The computer program product of claim 15, wherein said computer program product is utilized during a logical drive migration.

21. The computer program product of claim 15, wherein said computer program product is utilized during a drive rebuild.

* * * * *